United States Patent
Su et al.

(10) Patent No.: US 8,085,732 B2
(45) Date of Patent: *Dec. 27, 2011

(54) WIRELESS COMMUNICATION TERMINAL AND ROAMING METHOD

(75) Inventors: Chi-Chung Su, Taipei Hsien (TW); Min-Chia Chiang, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 760 days.

This patent is subject to a terminal disclaimer.

(21) Appl. No.: 12/211,823

(22) Filed: Sep. 17, 2008

(65) Prior Publication Data

US 2009/0135794 A1 May 28, 2009

(30) Foreign Application Priority Data

Nov. 28, 2007 (CN) .......................... 2007 1 0202738

(51) Int. Cl.
*H04W 4/00* (2009.01)
(52) U.S. Cl. ...... 370/332; 370/331; 455/436; 455/452.2
(58) Field of Classification Search .................. 370/328, 370/329, 330, 331, 332, 333, 334, 335, 336, 370/337, 338; 455/432.1, 436, 452.2, 453, 455/552.1, 550.1, 437–444
See application file for complete search history.

(56) References Cited

U.S. PATENT DOCUMENTS

| | | | |
|---|---|---|---|
| 7,457,319 B2 * | 11/2008 | Madapushi et al. | 370/476 |
| 7,991,425 B2 * | 8/2011 | Su et al. | 455/550.1 |
| 2003/0161340 A1 | 8/2003 | Sherman | |
| 2004/0039817 A1 | 2/2004 | Lee et al. | |
| 2004/0125753 A1 | 7/2004 | Mahany et al. | |
| 2004/0242230 A1 | 12/2004 | Rue | |
| 2004/0246922 A1 * | 12/2004 | Ruan et al. | 370/331 |
| 2007/0091839 A1 | 4/2007 | Abdelhamid et al. | |
| 2007/0217384 A1 | 9/2007 | Mitani | |

* cited by examiner

*Primary Examiner* — Chi Pham
*Assistant Examiner* — Weibin Huang
(74) *Attorney, Agent, or Firm* — Altis Law Group, Inc.

(57) ABSTRACT

A wireless communication terminal roaming from a current access point (AP) to a destination AP within a plurality of APs includes various functional modules. The wireless communication terminal detects a current service quality parameter of each of the plurality of APs, a roaming frequency, and a packet retransmission rate of the wireless communication terminal in a predetermined detection period. Furthermore, the wireless communication terminal calculates a value of an RQI according to the current service quality parameter of each of the plurality of APs, the roaming frequency, and the packet retransmission rate of the wireless communication terminal, and regulates a roaming threshold of the current AP according to the value of the RQI and determines the destination AP that has satisfied a roaming condition corresponding to the value of the RQI.

18 Claims, 3 Drawing Sheets

WIRELESS COMMUNICATION TERMINAL AND ROAMING METHOD

BACKGROUND

1. Field of the Invention

Embodiments of the present disclosure relate to wireless communication terminals, and particularly, to a wireless communication terminal and roaming method.

2. Description of Related Art

Wireless communication terminals can communicate with an access point (AP) over a wireless local area network (WLAN). Usually, each AP can connect to a certain number of wireless communication terminals. If a received signal strength indication (RSSI) of a current AP becomes weak due to connections with too many wireless communication terminals, or the WLAN is significantly blocked, communications between the current AP and the wireless communication terminals may be interrupted. Currently, wireless communication terminals may connect to other APs that have better communication quality than that of the current AP to maintain normal data transmission. This process is known as roaming.

If available, wireless communication terminals will select a destination AP that has a stronger RSSI and better communication quality to roam. However, in reality, a plurality of wireless communication terminals may simultaneously roam to the same destination AP. Therefore, loading of the destination AP is increased, which may result in unsuccessful roaming and abnormal communication between the wireless communication terminals and the destination AP.

SUMMARY

A wireless communication terminal for roaming from a current access point (AP) to a destination AP within a plurality of APs includes a detection module, a roaming policy regulating module, and a roaming determining module. The detection module is configured for detecting a current service quality parameter of each of the plurality of APs, the roaming frequency and the packet retransmission rate of the wireless communication terminal in a predetermined detection period. The roaming policy regulating module is configured for calculating a value of a radio quality index (RQI) according to the current service quality parameter of each of the plurality of APs, the roaming frequency and the packet retransmission rate of the wireless communication terminal, and regulating a roaming threshold of the current AP according to the RQI value. The roaming determining module is configured for determining the destination AP that has satisfied a roaming condition corresponding to the RQI value.

Other advantages and novel features will become more apparent from the following detailed description when taken in conjunction with the accompanying drawings.

DETAILED DESCRIPTION OF CERTAIN INVENTIVE EMBODIMENTS

Figure 1:
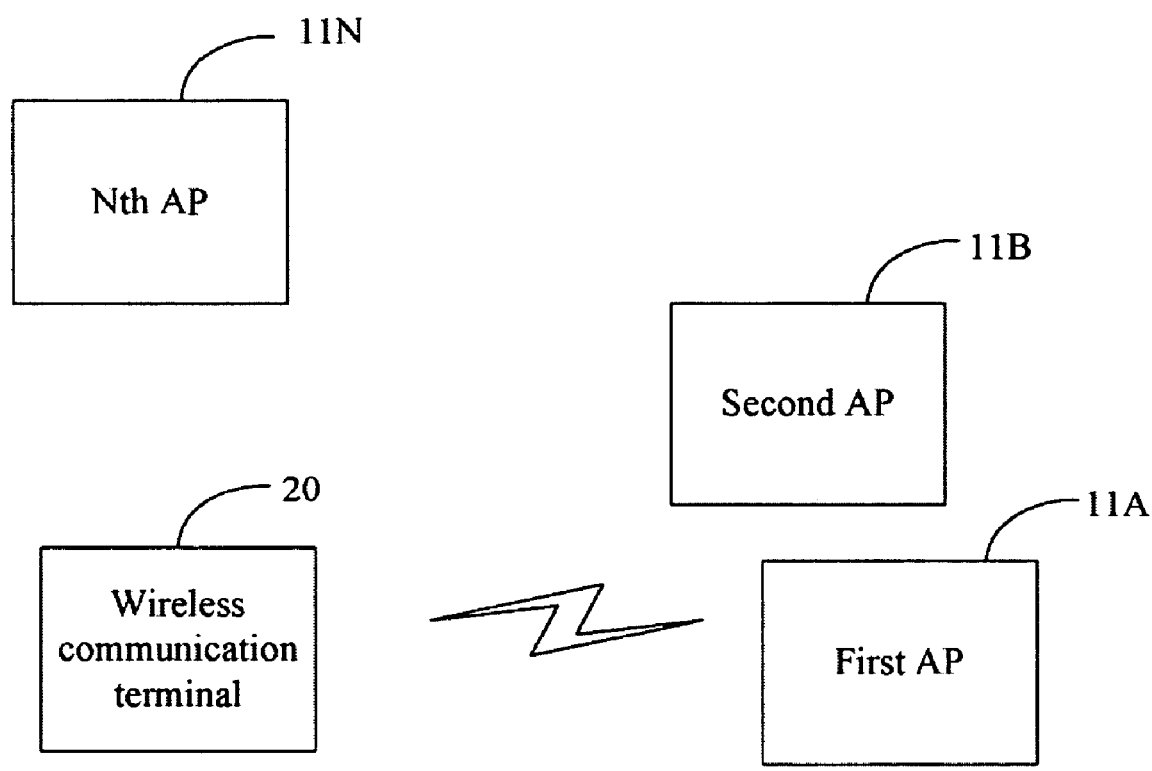
FIG. 1 is a schematic diagram of one embodiment of an application environment of a wireless communication terminal of the present disclosure.

FIG. 1 is a schematic diagram of one embodiment of an application environment of a wireless communication terminal 20. In one embodiment, the wireless communication terminal 20 communicates with a first access point (AP) 11A to connect to the Internet (not shown), along with other APs located around the wireless communication terminal 20, such as the second AP 11B up to the Nth AP 11N. If the service quality of the first AP 11A becomes bad and cannot maintain normal communication with the wireless communication terminal 20 in a wireless local area network (WLAN), the wireless communication terminal 20 attempts to roam away from the first AP 11A to another AP for better service quality.

The wireless communication terminal 20 and the APs 11A to 11N may communicate with one another in compliance with the 802.11 serial standards of the Institute of Electrical and Electronics Engineers (IEEE). The wireless communication terminal 20 and the APs 11A-11N may comply with other mobile communication standards, such as global system for mobile communications (GSM), code division multiple access (CDMA), wideband CDMA (WCDMA), universal mobile telecommunications system (UMTS), and high speed downlink packet access (HSDPA). The wireless communication terminal 20 may be a dual mode phone or a multiple mode mobile phone, a personal digital assistant (PDA), a smart phone, or a laptop computer with wireless access functions.

Figure 2:
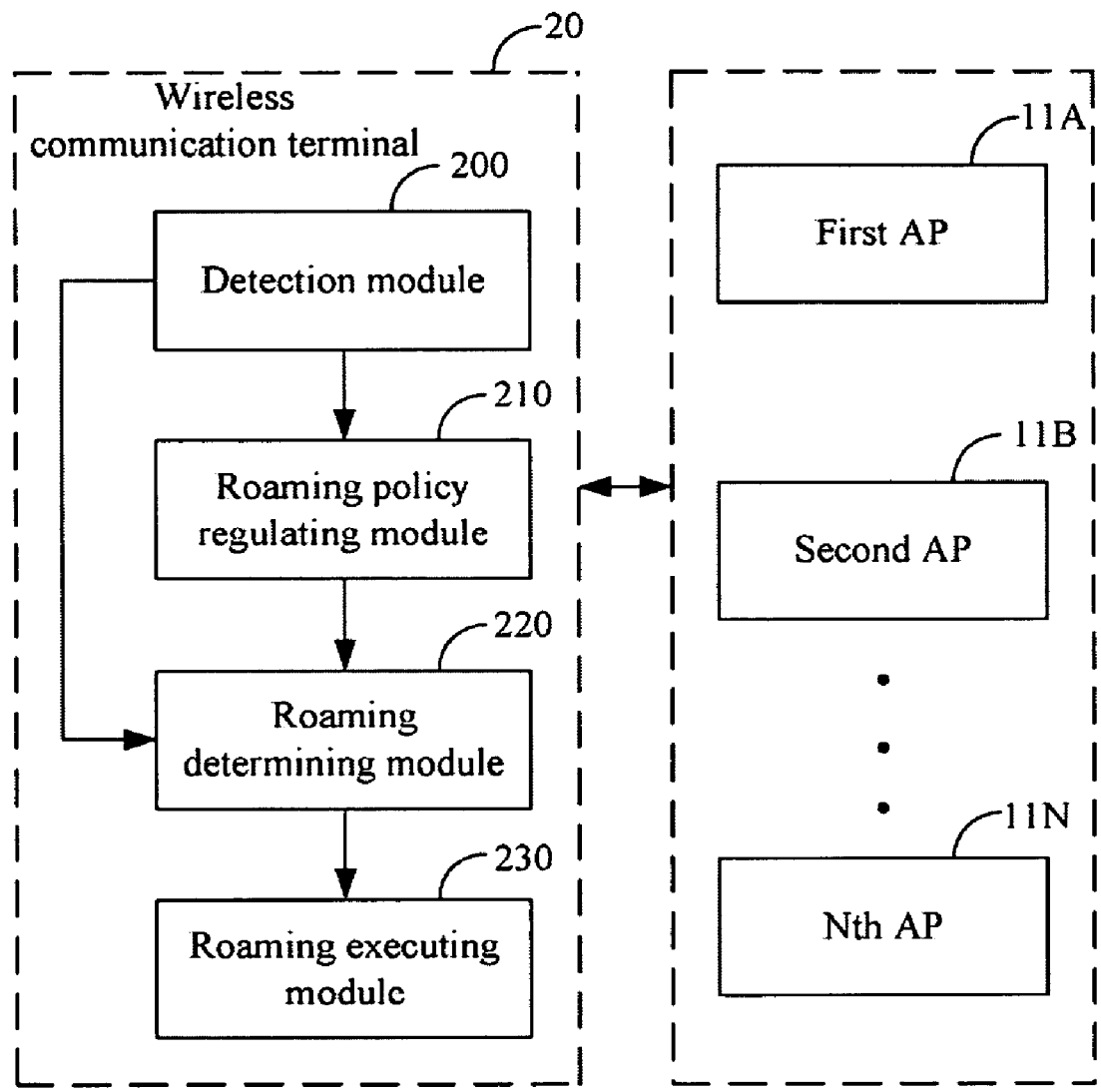
FIG. 2 is a block diagram of one embodiment of the wireless communication terminal of the present disclosure communicating with one or more access points.

FIG. 2 is a block diagram of one embodiment of the wireless communication terminal 20 of the present disclosure communicating with one or more APs. For example, the wireless communication terminal 20 is assumed to currently communicate with the first AP 11A (hereinafter referred to as "current AP"). In one embodiment, the wireless communication terminal 20 includes a detection module 200, a roaming policy regulating module 210, a roaming determining module 220, and a roaming executing module 230, all of which may be implemented by software or electronic circuits depending on the embodiment.

The detection module 200 is configured for detecting the service quality of the wireless communication terminal 20 in a predetermined detection period. The service quality of the wireless communication terminal 20 includes one or more of the following parameters: a current service quality parameter of each of the APs 11A-11N, a roaming frequency and a packet retransmission rate of the wireless communication terminal 20.

In one embodiment, the current service quality parameter of each of the APs 11A-11N includes a quality of service basic service set (QBSS) and a received signal strength indication (RSSI) variance of each of the APs 11A-11N. The QBSS of each of the APs 11A-11N represents a current channel utilization rate and a current loading of each of the APs 11A-11N. The bigger a value of the QBSS is, the smaller the current channel utilization rates of a corresponding one of the APs 11A-11N will be, the bigger the current loading of the corresponding one of the APs 11A-11N will be, and the lower the quality of service (Qos) of the corresponding one of the APs 11A-11N will be.

The RSSI variance of the APs 11A-11N is a RSSI variance of each of the APs 11A-11N in the predetermined detection period, and represents a stability of each of the AP 11A-11N. The bigger the value of the RSSI variance is, the better the stability of a corresponding one of the APs 11A-11N will be. Specifically, the Qos of the corresponding one of the APs 11A-11N is better. The roaming frequency of the wireless communication terminal 20 is the roaming amount of the wireless communication terminal 20 in a system operation period, which is detected by the detection module 200 in the predetermined detection period and indicates the communication stability between the wireless communication terminal 20 and each of the APs 11A-11N. The communication stability between the wireless communication terminal 20 and each of the APs 11A-11N decreases when the roaming frequency increases. The packet retransmission rate of the wireless communication terminal 20 is the packet retransmission amount in an audio operation period, which indicates the communication stability between the wireless communication terminal 20 and the current AP. The communication stability between the wireless communication terminal 20 and the current AP decreases when the packet retransmission rate increases. In one embodiment, both the system operation period and the audio operation period may be predetermined as 2 seconds. The predetermined detection period, the system operation period, and the audio operation period can be set to be the same or different from each other.

The detection module 200 is further configured for sending the current service quality parameters of each of the APs 11A-11N, the roaming frequency and the packet retransmission rate of the wireless communication terminal 20 to the roaming policy regulating module 210 and the roaming determining module 220.

The roaming policy regulating module 210 is configured for receiving the current service quality parameters of each of the APs 11A-11N, the roaming frequency and the packet retransmission rate of the wireless communication terminal 20, calculating a value of a radio quality index (RQI), and regulating a roaming threshold of the current AP according to the value of the RQI. In one embodiment, the value of the RQI is equal to a maximum value of the RQI minus iRQI. The maximum value of the RQI may be predetermined in one embodiment. The iRQI is calculated according to following expression:

$$iRQI = (((Avg\_QBSS/Max\_QBSS)*Max\_RQI)*0.5) + \\ (((Roam\_Freq/Max\_Freq)*Max\_RQI)*0.2) + \\ (((Retx\_Rate/Max\_Retx\_Rate)*Max\_RQI)*0.2) + \\ (((Avg\_RSSI\_Variance/Max\_RSSI\_Variance) \\ *Max\_RQI)*0.1)$$

where the Avg_QBSS represents an average value of the QBSS, the Max_QBSS is a maximum value of the QBSS, the Max_RQI is the maximum value of the RQI, the Roam_Freq represents a current roaming amount of the wireless communication terminal 20, the Max_Freq is a maximum roaming amount of the wireless communication terminal 20, the Retx_Rate represents a current packet retransmission rate of the wireless communication terminal 20, the Max_Retx_Rate is a maximum packet retransmission rate of the wireless communication terminal 20, Avg_RSSI_Variance represents an average RSSI variance of each of the APs 11A-11N, and the Max_RSSI_Variance is a maximum RSSI variance of each of the APs 11A-11N.

In one embodiment, the predetermined value of the Max_RQI may be set to 100, the Max_QBSS may be set to 100, the Avg-QBSS is the average value of the QBSSes of the APs 11A-11N. The Max_Freq is a maximum roaming amount allowed within the wireless communication terminal 20 in the system operation period, such as 15. The Roam_Freq is the current roaming amount of the wireless communication terminal 20 in the system operation period detected by the detection module 200 in the predetermined detection period. The Max_Retx_Rate is the maximum packet retransmission amount of the wireless communication terminal 20 in the audio operation period, and the Retx_Rate is a current packet retransmission amount of the wireless communication terminal 20 in the audio operation period detected by the detection module 200 in the predetermined detection period. The Max_RSSI_Variance is the maximum RSSI variance of each of the APs 11A-11N in the predetermined detection period, and the Avg_RSSI_Variance is the average RSSI variance of each of the APs 11A-11N detected by the detection module 200 in the predetermined detection period.

In one embodiment, different values of the RQI represent different service qualities of the current AP, where the different service qualities of the current AP include a normal status, a high traffic status, and an interference status. If the value of the RQI is not less than a first threshold, the service quality of the current AP is in the normal status, and the service quality is normal. If the value of the RQI is between a second threshold and the first threshold, the service quality of the current AP is in the high traffic status, and the service quality is bad. If the value of the RQI is less than the second threshold, the service quality of the current AP is in the interference status, and the service quality is at its worst state, where the first threshold is bigger than the second threshold. In one embodiment, the first threshold may be 70 and the second threshold may be 40. In alternative embodiments, the service quality of the current AP can be measured according to different values of the RQI, and different thresholds can be set, but are not limited, to 40 and 70.

The roaming policy regulating module 210 is configured for regulating the roaming threshold of the current AP according to the value of the RQI. If the value of the RQI is less than 70, the roaming policy regulating module 210 regulates the roaming threshold of the current AP higher. The smaller RQI is, the higher the roaming threshold is. In one embodiment, the roaming threshold includes differences of the RSSI and the QBSS respectively between the destination AP and the current AP. In one exemplary embodiment, if the value of the RQI is not less than 70, the difference of the RSSI between the destination AP and the current AP of the roaming threshold is 20, and the difference of the QBSS between the destination AP and the current AP of the roaming threshold is 15. If the value of the RQI is between 40 and 70, the difference of the RSSI between the destination AP and the current AP of the roaming threshold is 30, and the difference of the QBSS between the destination AP and the current AP of the roaming threshold is 25. If the value of the RQI is less than 40, the difference of the RSSI between the destination AP and the current AP of the roaming threshold is 35, and the difference of the QBSS between the destination AP and the current AP of the roaming threshold is also 35.

The roaming policy regulating module 210 is further configured for sending the value of the RQI and the regulated roaming threshold to the roaming determining module 220.

The roaming determining module 220 is configured for receiving the service quality from the detection module 200, along with the value of the RQI and the regulated roaming threshold from the roaming policy regulating module 210, thereby determining the destination AP that has satisfied a roaming condition corresponding to the value of the RQI.

In one embodiment, different values of the RQI correspond to different roaming conditions. If the value of the RQI is not less than 70 (i.e., the service quality of the current AP is in its normal status), the roaming condition is that the differences of the RSSI and the QBSS respectively between the destination AP and the current AP are greater than those of the roaming threshold.

If the value of the RQI is between 40 and 70 (i.e., the service quality of the current AP is in its high traffic status), the roaming condition includes that the differences of the RSSI and the QBSS respectively between the destination AP and the current AP are greater than those of the roaming threshold, the destination AP and the current AP are in different channels, and roaming of the wireless communication terminal 20 to the destination AP should be delayed. A delay time before the wireless communication terminal 20 roaming to the destination AP is random depending on the embodiment.

If the value of the RQI is less than 40 (i.e., the service quality of the current AP is in its interference status), there are two different roaming conditions according to different communication statuses of the wireless communication terminals 20. If the wireless communication terminal 20 is in a communication status, the roaming condition is that the value of the RSSI of the destination AP is greater than that of the current AP while the value of the QBSS of the destination AP is less than those of the current AP and other APs 11B-11N. If the wireless communication terminal 20 is not in its communication status, the roaming condition includes that the differences of the RSSI and the QBSS respectively between the destination AP and the current AP are greater than those of the roaming threshold and the value of the QBSS of the destination AP is less than those of the current AP and other APs 11B-11N.

The roaming determining module 220 is further configured for generating a roaming executing command and sending the roaming executing command and the value of the RSSI of the destination AP to the roaming executing module 230 if the destination AP has satisfied the roaming condition corresponding to the value of the RQI.

If the roaming determining module 220 determines that the destination AP has not satisfied the roaming condition corresponding to the value of the RQI, the roaming determining module 220 does not act.

The roaming executing module 230 is configured for receiving the roaming executing command and the value of the RSSI of the destination AP, ending the communication between the wireless communication terminal 20 and the current AP, and establishing a communication between the wireless communication terminal 20 and the destination AP.

Figure 3:
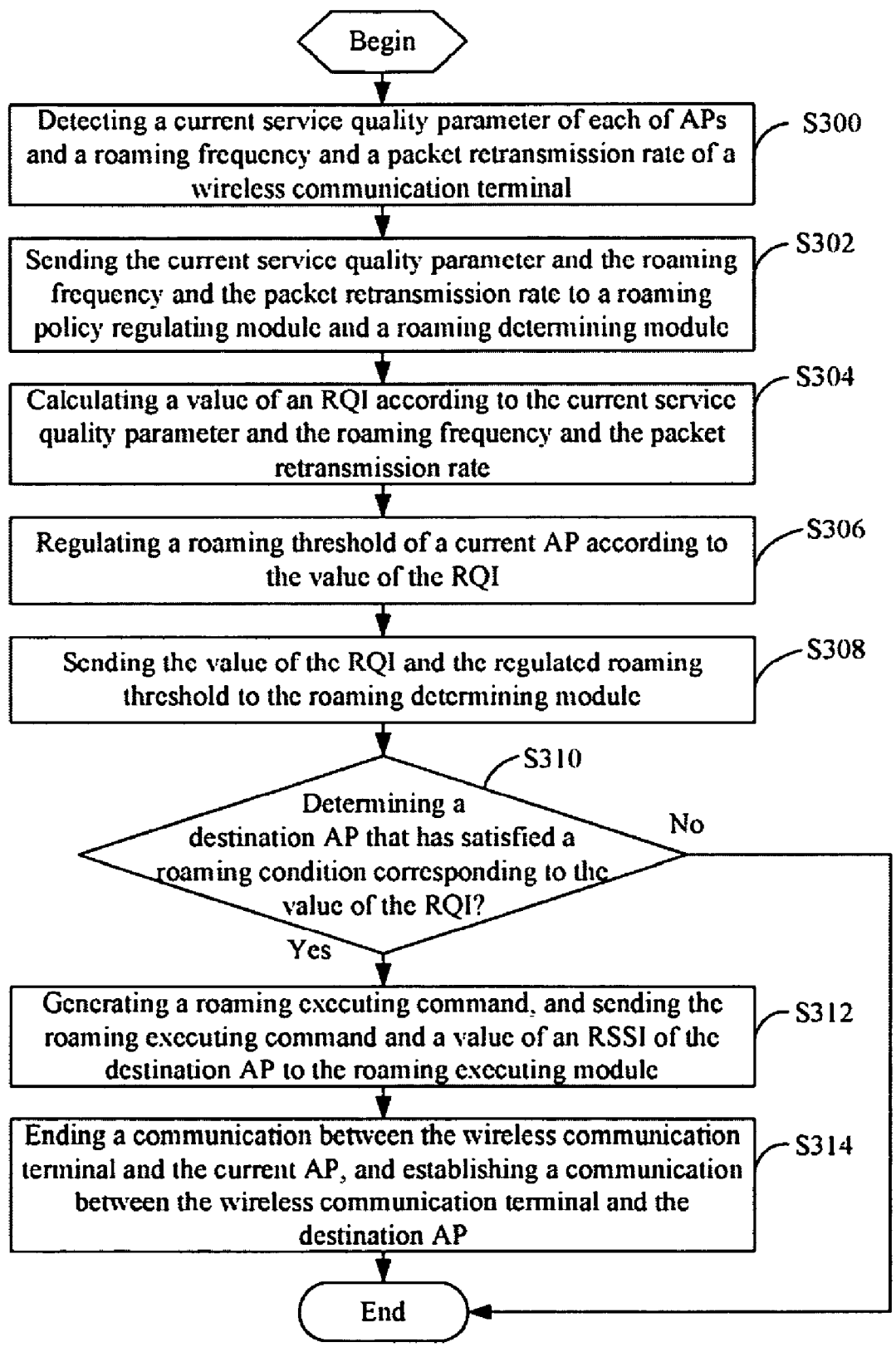
FIG. 3 is a flowchart of one embodiment of a roaming method according to service quality parameters of the present disclosure.

FIG. 3 is a flowchart of one embodiment of a roaming method according to the service quality parameters of the wireless communication terminal 20 of the present disclosure. In one embodiment, the wireless communication terminal 20 communicates with one or more of the APs 11A-11N located around the wireless communication terminal 20. As mentioned above, the wireless communication terminal 20 attempts to roam away from a current AP to another AP for better service quality.

In block S300, the detection module 200 detects a current service quality parameter of each of the APs 11A-11N, a roaming frequency and a packet retransmission rate of the wireless communication terminal 20 in a predetermined detection period. In one exemplary embodiment, the current service quality parameter of each of the APs 11A-11N includes a QBSS and a RSSI variance of each of the APs 11A-11N. The QBSS of each of the APs 11A-11N represents a current channel utilization rate of all channels and a current loading of each of the APs 11A-11N. The RSSI variance of each of the APs 11A-11N is a RSSI variance of each of the APs 11A-11N in the predetermined period, and represents a stability of each of the APs 11A-11N. The roaming frequency of the wireless communication terminal 20 is a roaming amount of the wireless communication terminal 20 in a system operation period detected by the detection module 200 in the predetermined detection period, and indicates communication stability between the wireless communication terminal 20 and each of the APs 11A-11N. The communication stability between the wireless communication terminal 20 and each of the APs 11A-11N decreases when the roaming frequency increases. The packet retransmission rate of the wireless communication terminal 20 is a packet retransmission amount of the wireless communication terminal 20 in an audio operation period, which indicates communication stability between the wireless communication terminal 20 and the current AP. The communication stability between the wireless communication terminal 20 and the current AP decreases when the packet retransmission rate increases.

In block S302, the detection module 200 sends the current service quality parameter of each of the APs 11A-11N, the roaming frequency and the packet retransmission rate of the wireless communication terminal 20 to the roaming policy regulating module 210 and the roaming determining module 220.

In block S304, the roaming policy regulating module 210 calculates a value of an RQI according to the current service quality parameter of each of the APs 11A-11N, the roaming frequency and the packet retransmission rate of the wireless communication terminal 20.

In block S306, the roaming policy regulating module 220 regulates a roaming threshold of the current AP according to the value of the RQI. As mentioned above, if the value of the RQI is less than 70, the roaming policy regulating module 210 regulates the roaming threshold of the current AP higher. The smaller the value of the RQI is, the higher the roaming threshold is regulated.

In block S308, the roaming policy regulating module 220 sends the value of the RQI and the regulated roaming threshold to the roaming determining module 220.

In block S310, the roaming determining module 220 determines the destination AP that has satisfied the roaming condition corresponding to the value of the RQI.

In one exemplary embodiment, different values of the RQI correspond to different roaming conditions. If the value of the RQI is not less than 70 (i.e., the service quality of the current AP is in the normal status), the roaming condition is that the differences of the RSSI and the QBSS respectively between the destination AP and the current AP are greater than those of the roaming threshold.

If the value of the RQI is between 40 and 70 (i.e., the service quality of the current AP is in the high traffic status), the roaming condition includes that the differences of the RSSI and the QBSS respectively between the destination AP and the current AP are greater than those of the roaming threshold, the destination AP and the current AP are in different channels, and roaming of the wireless communication terminal 20 to the destination AP should be delayed. A delay time before the wireless communication terminal 20 roams to the destination AP is random depending on the embodiment.

If the value of the RQI is less than 40 (i.e. the service quality of the current AP is in the interference status), there are two different roaming conditions according to different communication statuses of the wireless communication terminals 20. If the wireless communication terminal 20 is in a communication status, the roaming condition is that the value of the RSSI of the destination AP is greater than that of the current AP while the value of the QBSS of the destination AP is less than those of the current AP and other APs 11B-11N. If the wireless communication terminal 20 is not in the communication status, the roaming condition includes that the differences of the RSSI and the QBSS respectively between the destination AP and the current AP are greater than those of the roaming threshold and the value of the QBSS of the destination AP is less than those of the current AP and other 11B-11N.

If the destination AP has satisfied the roaming condition corresponding to the value of the RQI, in block S312, the roaming determining module 220 generates a roaming executing command, and sends the roaming executing command and the value of the RSSI of the destination AP to the roaming executing module 230. Then, in block S314, the roaming executing module 230 ends the communication between the wireless communication terminal 20 and the current AP, and establishes a communication between the wireless communication terminal 20 and the destination AP.

If the roaming determining module 220 determines that there is no destination AP that has satisfied the roaming condition corresponding to the value of the RQI, the roaming determining module 220 does not act, and the process ends.

The wireless communication terminal 20 allow the wireless communication terminal 20 to selectively roam to destination APs, and avoid the wireless communication terminals 20 that have similar status roaming to the same AP. Thus, successful roaming of the wireless communication terminal 20 is ensured.

The foregoing disclosure of various embodiments has been presented for purposes of illustration and description. It is not intended to be exhaustive or to limit the present disclosure to the precise forms disclosed. Many variations and modifications of the embodiments described herein will be apparent to one of ordinary skill in the art in light of the above disclosure. The scope of the present disclosure is to be defined only by the claims appended hereto and their equivalents.

What is claimed is:

1. A wireless communication terminal for roaming from a current access point (AP) to a destination AP within a plurality of APs, comprising:
    a detection module configured for detecting a current service quality parameter of each of the plurality of APs, a roaming frequency and a packet retransmission rate of the wireless communication terminal in a predetermined detection period;
    a roaming policy regulating module configured for calculating a value of a radio quality index (RQI) according to the current service quality parameter of each of the plurality of APs, the roaming frequency and the packet retransmission rate of the wireless communication terminal, and regulating a roaming threshold of the current AP according to the value of the RQI; and
    a roaming determining module configured for determining the destination AP that has satisfied a roaming condition corresponding to the value of the RQI;
    wherein the current service quality parameter of each of the plurality of APs includes a quality of service basic service set (QBSS) and a receive signal strength indication (RSSI) variance of each of the plurality of APs, wherein the QBSS of each of the plurality of APs represents a current channel utilization rate and a current loading of each of the plurality of APs, and wherein the RSSI variance of each of the plurality of APs is a RSSI variance of each of the plurality of APs in the predetermined detection period, and represents a stability of each of the plurality of APs; wherein the roaming frequency of the wireless communication terminal is a roaming amount of the wireless communication terminal in a system operation period detected by the detection module in the predetermined detection period, and indicates a communication stability between the wireless communication terminal and each of the plurality of APs, and wherein the communication stability between the wireless communication terminal and each of the plurality of APs decreases when the roaming frequency increases; and wherein the packet retransmission rate of the wireless communication terminal is a packet retransmission amount in an audio operation period, and wherein the packet retransmission rate of the wireless communication terminal indicates a communication stability between the wireless communication terminal and the current AP, wherein the communication stability between the wireless communication terminal and the current AP decreases when the packet retransmission rate increases.

2. The wireless communication terminal of claim 1, wherein the value of the RQI is equal to a maximum value of the RQI minus iRQI, wherein the maximum value of the RQI is predetermined, and wherein the iRQI is calculated according to following expression: iRQI=(((an average value of the QBSS/a maximum value of the QBSS)*the maximum value of the RQI)*0.5)+(((current roaming amount/maximum roaming amount)*the maximum value of the RQI)*0.2)+(((a current packet retransmission rate/a maximum packet retransmission rate)*the maximum value of the RQI)*0.2)+(((an average RSSI variance/a maximum RSSI variance)*the maximum value of the RQI)*0.1).

3. The wireless communication terminal of claim 2, wherein different values of the RQI represent different service qualities of the current AP, and the different service qualities include a normal status, a high traffic status, and an interference status.

4. The wireless communication terminal of claim 3, wherein the roaming threshold comprises differences of the RSSI and the QBSS respectively between the destination AP and the current AP.

5. The wireless communication terminal of claim 4, wherein the roaming condition is that the differences of the RSSI and the QBSS respectively between the destination AP and the current AP are greater than those of the roaming threshold upon the condition that the value of the RQI represents the service quality of the current AP in the normal status.

6. The wireless communication terminal of claim 4, wherein the roaming condition comprises that the differences of the RSSI and the QBSS respectively between the destination AP and the current AP are greater than those of the roaming threshold, the destination AP and the current AP are in different channels, and roaming of the wireless communication terminal to the destination AP should be delayed upon the condition that the value of the RQI represents the service quality of the current AP in the high traffic status.

7. The wireless communication terminal of claim 4, wherein the roaming condition is that the value of the RSSI of the destination AP is greater than that of the current AP while the value of the QBSS of the destination AP is less than those of the current AP and other APs of the plurality of APs upon the condition that the value of the RQI represents the service quality of the current AP in the interference status and the wireless communication terminal in a communication status.

8. The wireless communication terminal of claim 4, wherein the roaming condition comprises that the differences of the RSSI and the QBSS respectively between the destination AP and the current AP are greater than those of the roaming threshold and the value of the QBSS of the destination AP is less than those of the current AP and other APs within the plurality of APs upon the condition that the value of the RQI represents that the service quality of the plurality of APs is in the interference status and the wireless communication terminal is not in a communication status.

9. The wireless communication terminal of claim 1, wherein the roaming determining module is further configured for generating a roaming executing command upon the condition that the destination AP has satisfied the roaming condition corresponding to the value of the RQI.

10. The wireless communication terminal of claim 9, further comprising a roaming executing module configured for ending a communication between the wireless communication terminal and the current AP and establishing a communication between the wireless communication terminal and the destination AP according to the roaming executing command and a value of an RSSI of the destination AP.

11. A roaming method for a wireless communication terminal roaming from a current access point (AP) to a destination AP within a plurality of APs, the method comprising:
   detecting a current service quality parameter of each of the plurality of APs, a roaming frequency and a packet retransmission rate of the wireless communication terminal in a predetermined detection period, wherein the current service quality parameter of each of the plurality of APs includes a quality of service basic service set (QBSS) and a receive signal strength indication (RSSI) variance of each of the plurality of APs, wherein the QBSS of each of the plurality of APs represents a current channel utilization rate and a current loading of each of the plurality of APs, and wherein the RSSI variance of each of the plurality of APs is a RSSI variance of each of the plurality of APs in the predetermined detection period, and wherein the RSSI variance of each of the plurality of APs represents a stability of each of the plurality of APs; wherein the roaming frequency of the wireless communication terminal is a roaming amount of the wireless communication terminal in a system operation period in the predetermined detection period, and wherein the roaming frequency of the wireless communication terminal indicates a communication stability between the wireless communication terminal and each of the plurality of APs, and wherein the communication stability between the wireless communication terminal and each of the plurality of APs decreases when the roaming frequency increases; and wherein the packet retransmission rate of the wireless communication terminal is a packet retransmission amount in an audio operation period, and wherein the packet retransmission rate indicates a communication stability between the wireless communication terminal and the current AP, and wherein the communication stability between the wireless communication terminal and the current AP decreases when the packet retransmission rate increases;
   calculating a value of a radio quality index (RQI) according to the current service quality parameter of each of the plurality of APs, the roaming frequency and the packet retransmission rate of the wireless communication terminal;
   regulating a roaming threshold of the current AP according to the value of the RQI;
   determining the destination AP that has satisfied a roaming condition corresponding to the value of the RQI; and
   ending a communication between the wireless communication terminal and the current AP and establishing a communication between the wireless communication terminal and the destination AP upon the condition that the destination AP has satisfied the roaming condition corresponding to the value of the RQI.

12. The roaming method of claim 11, further comprising:
   generating a roaming executing command upon the condition that the destination AP has satisfied the roaming condition corresponding to the value of the RQI; and
   sending the roaming executing command and a value of a receive signal strength indication (RSSI) of the destination AP to a roaming executing module.

13. The roaming method of claim 11, wherein the value of the RQI is equal to a maximum value of the RQI minus iRQI, the maximum value of the RQI is predetermined, and the iRQI is calculated according to following expression: iRQI= (((an average value of the QBSS/a maximum value of the QBSS)*the maximum value of the RQI)*0.5)+(((current roaming amount/maximum roaming amount)*the maximum value of the RQI)*0.2)+(((a current packet retransmission rate/a maximum packet retransmission rate)*the maximum value of the RQI)*0.2)+(((an average RSSI variance/a maximum RSSI variance)*the maximum value of the RQI)*0.1).

14. The roaming method of claim 13, wherein different values of the RQI represent different service qualities of the current AP, and the different service qualities of the current AP comprise a normal status, a high traffic status, and an interference status, and wherein the roaming threshold includes differences of the RSSI and the QBSS respectively between the destination AP and the current AP.

15. The roaming method of claim 14, wherein the roaming condition is that the differences of the RSSI and the QBSS respectively between the destination AP and the current AP are greater than those of the roaming threshold upon the condition that the value of the RQI represents that the service quality of the current AP is in the normal status.

16. The roaming method of claim 14, wherein the roaming condition comprises that the differences of the RSSI and the QBSS respectively between the destination AP and the current AP are greater than those of the roaming threshold, the destination AP and the current AP are in different channels, and roaming of the wireless communication terminal to the destination AP should be delayed upon the condition that the value of the RQI represents that the service quality of the current AP is in the high traffic status.

17. The roaming method of claim 14, wherein the roaming condition is that the value of the RSSI of the destination AP is greater than that of the current AP while the value of the QBSS of the destination AP is less than those of the current AP and other APs within the plurality of APs upon the condition that the value of the RQI represents that the service quality of the current AP is in the interference status and the wireless communication terminal is in a communication status.

18. The roaming method of claim 14, wherein the roaming condition comprises the differences of the RSSI and the QBSS respectively between the destination AP and the current AP are greater than those of the roaming threshold and the value of the QBSS of the destination AP is less than those of the current AP and other APs within the plurality of APs upon the condition that the value of the RQI represents that the service quality of the current AP is in the interference status and the wireless communication terminal is not in a communication status.

* * * * *